United States Patent
Janosi et al.

(10) Patent No.: US 10,123,263 B2
(45) Date of Patent: Nov. 6, 2018

(54) OVERLAY IMPLEMENTATION OF IMS CENTRALIZED SERVICE NETWORK SYSTEM WITH SELECTION OF SERVING NETWORK ENTITY WITHIN A POOL

(71) Applicant: NOKIA SOLUTIONS AND NETWORKS OY, Espoo (FI)

(72) Inventors: Laszlo Janosi, Budapest (HU); Karl Markus Goran Martin, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 104 days.

(21) Appl. No.: 15/111,524

(22) PCT Filed: Jan. 15, 2014

(86) PCT No.: PCT/EP2014/050702
§ 371 (c)(1),
(2) Date: Jul. 14, 2016

(87) PCT Pub. No.: WO2015/106810
PCT Pub. Date: Jul. 23, 2015

(65) Prior Publication Data
US 2016/0337955 A1    Nov. 17, 2016

(51) Int. Cl.
*H04W 4/00*  (2018.01)
*H04W 48/00* (2009.01)
(Continued)

(52) U.S. Cl.
CPC ........... *H04W 48/17* (2013.01); *H04W 48/18* (2013.01); *H04W 60/00* (2013.01); *H04W 8/22* (2013.01)

(58) Field of Classification Search
None
See application file for complete search history.

(56) References Cited

U.S. PATENT DOCUMENTS

| 2010/0080186 A1* | 4/2010 | Guo ................ H04W 28/08 370/329 |
| 2012/0069840 A1* | 3/2012 | Zhu ................. H04M 7/123 370/353 |

(Continued)

FOREIGN PATENT DOCUMENTS

WO    WO 2013/047822 A1    4/2013

OTHER PUBLICATIONS

International Search Report and Written Opinion dated Nov. 25, 2014 corresponding to International Patent Application No. PCT/EP2014/050702.

(Continued)

*Primary Examiner* — Jutai Kao
(74) *Attorney, Agent, or Firm* — Squire Patton Boggs (US) LLP

(57) ABSTRACT

In a mobile communication networks system supporting IP Multimedia Subsystem, IMS, centralized services, there are provided measures for enabling/realizing an overlay implementation of a IMS centralized service network system taking into account a pool of network entities with different IMS centralized services capabilities. Such measures based on a IMS centralized-services applicability for a terminal requesting attachment and an IMS centralized-services capability of at least one switching entity out of a pool of switching entities which are configured to control radio resources for a same radio network area. In case of a mismatch between the IMS centralized-services applicability for the terminal and the IMS centralized-services capability of the switching entity the attachment request can be redirected to another switching entity out of said pool, which has a matching IMS centralized-services capability. Also, when receiving an attach request, a switching entity can be selected out of said pool, which has a matching centralized- (Continued)

services capability, and the requested attachment can be directed to the selected switching entity.

17 Claims, 8 Drawing Sheets

(51) Int. Cl.
    *H04W 48/18*     (2009.01)
    *H04W 60/00*     (2009.01)
    *H04W 8/22*     (2009.01)

(56) References Cited

U.S. PATENT DOCUMENTS

| | | | |
|---|---|---|---|
| 2013/0028196 A1* | 1/2013 | Zou | H04W 8/20 370/328 |
| 2014/0211728 A1 | 7/2014 | Zembutsu et al. | |
| 2017/0251103 A1* | 8/2017 | Zembutsu | H04M 3/42 |

OTHER PUBLICATIONS

3GPP TS 23.292 V12.2.0 (Jun. 2013), Technical Specification, 3rd Generation Partnership Project; Technical Specification Group Services and System Aspects; IP Multimedia Subsystem (IMS) centralized services; Stage 2 (Release 12), Jun. 22, 2013, pp. 1-120, XP050692717.

3GPP TS 23.236 V12.0.0 (Jun. 2013), Technical Specification, 3rd Generation Partnership Project; Technical Specification Group Services and System Aspects; Intra-domain connection of Radio Access Network (RAN) nodes to multiple Core Network (CN) nodes (Release 12), Jun. 2013, pp. 1-40.

* cited by examiner

OVERLAY IMPLEMENTATION OF IMS CENTRALIZED SERVICE NETWORK SYSTEM WITH SELECTION OF SERVING NETWORK ENTITY WITHIN A POOL

FIELD

The present invention relates to overlay implementation of centralized service network system. More specifically, the present invention relates to measures (including methods, apparatuses and computer program products) for enabling/realizing an overlay implementation of a centralized service network system.

BACKGROUND

Current cellular communication systems according to 3GPP specifications are typically based on the Evolved Packet System (EPS) which provides a new radio interface and new core network functions for broadband wireless data access. The EPS radio interface consists of (LTE/LTE-A-based) packet-switched network access via E-UTRAN, which is provided in addition to (2G/3G-based) network accesses via UTRAN and GERAN.

An UE representing a subscriber can be camped on, and thus served by, any one of different network accesses or domains, namely E-UTRAN or UTRAN or GERAN, but not two network accesses or domains simultaneously. That is, when the UE is camped on E-UTRAN, it is not reachable over UTRAN or GERAN.

In an effort to ensure consistent service experience for subscribers in the EPS framework, various concepts are proposed for implementation in existing CS network accesses or domains.

On the one hand, the concepts of Circuit-Switched Fallback (CSFB) and Single Radio Voice Call Continuity (SR-VCC) are specified, which are applicable in the EPS framework. By the CSFB and SR-VCC concepts, specific services can be continued by way of the circuit-switched network access or domain, i.e. via UTRAN or GERAN, when these can not or no longer be provided by way of the packet-switched network access or domain, i.e. via E-UTRAN. For implementing these concepts, no specific control of radio resources is required, and thus a correspondingly configured network node with respective functionality can be connected to MSC servers in existing CS network accesses or domains.

On the other hand, the concept of IMS Centralized Service (ICS) is specified, which is applicable in the EPS framework. By the ICS concept, the services are provided centrally from the centralized IMS service domain, instead of being provided locally from a specific network access or domain. The centralized IMS service domain is access agnostic. For implementing this concept, an appropriate control of radio resources is required, since the centralized IMS service domain has to ensure that the UE is serviceable (i.e. able to connect to or be accessible via a circuit-switched radio access network). Hence, a correspondingly configured network node with respective functionality, such as an ICS-enabled MSC server, is to be deployed in existing CS network accesses or domains.

FIG. 1 shows a schematic diagram illustrating the ICS architecture according to 3GPP TS 23.292, which represents an architecture of a centralized service network system.

In the ICS architecture (also referred to as IMS service continuation and continuity reference architecture), the circuit-switched (CS) domain (including GERAN/UTRAN, MSC Server, etc.) becomes a simple CS access network which does not execute services itself, but only ensures that the UE sessions are delivered to the centralized IMS service domain where the services are actually executed. In both cases of mobile-terminating and mobile-originating sessions, the centralized IMS service domain ensures that the UE is serviceable. When an UE using ICS roams between the different access networks (like E-UTRAN and CS), the UE can use the same services independently from its currently used access because those are executed in the centralized IMS service domain.

When the UE is under CS access and performs a usual location update procedure to the MSC Server, the MSC Server registers itself in the IMS service domain, namely in the Service Centralization and Continuity Application Server (SCC-AS) therein, as a contact point for the UE for the provision/execution of centralized services. So, when a mobile-terminating session arrives at the SCC-AS for this UE, the SCC-AS will know to which MSC Server the session should be routed in order to reach the UE so as to provide/execute the requested service.

Accordingly, the service provision/execution for a UE in such centralized service network system, like the ICS service domain, is based on the registration of a mobile switching system, such as a MSC server, as a contact point for centralized services for the UE. In order to ensure service continuity in such centralized service network system, like the ICS service domain, it is thus required to ensure a correct and continuous registration of the contact point for centralized services for the UE.

For the implementation of any one of the aforementioned concepts for ensuring consistent service experience for subscribers in the EPS framework, correspondingly configured network nodes, i.e. MSC servers, with respective functionality are to be deployed in existing CS network accesses or domains. However, in view of the associated efforts and costs as well as potential reliability considerations or the like, operators do not want to replace or upgrade all existing MSC servers in their communication infrastructure at once so as to support the respective functionality. Rather, operators want to introduce such concepts by way of an overlay implementation, i.e. by replacing or upgrading only a part of the existing MSC servers in their communication infrastructure at once so as to support the respective functionality. That is, an overlay implementation is to be enabled/realized such that no changes are required in legacy network nodes (i.e. network nodes without the newly introduced CSFB, SR-VCC, ICS functionality), or the required changes are minimal.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising receiving an attach request for attachment of a terminal, determining a centralized-services applicability for the terminal, comparing the determined centralized-services applicability for the terminal and a centralized-services capability of a switching entity handling the attach request, and in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same pool of switching entities as the switching entity handling the attach request, said pool of switching entities being configured to control radio resources for a same radio network area.

According to an example aspect of the present invention, there is provided a method comprising receiving an attach request for attachment of a terminal, determining a centralized-services applicability for the terminal, selecting a switching entity for handling the attach request out of a pool of switching entities such that the selected switching entity has a centralized-services capability matching the determined centralized-services applicability for the terminal, said pool of switching entities being configured to control radio resources for a same radio network area, and directing the requested attachment to the selected switching entity having the centralized-services capability matching the determined centralized-services applicability for the terminal.

According to an example aspect of the present invention, there is provided an apparatus comprising a processor, and a memory configured to store computer program code, wherein the processor is configured to cause the apparatus to perform: receiving an attach request for attachment of a terminal, determining a centralized-services applicability for the terminal, comparing the determined centralized-services applicability for the terminal and a centralized-services capability of a switching entity handling the attach request, and in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same pool of switching entities as the switching entity handling the attach request, said pool of switching entities being configured to control radio resources for a same radio network area.

According to an example aspect of the present invention, there is provided an apparatus comprising a processor, and a memory configured to store computer program code, wherein the processor is configured to cause the apparatus to perform: receiving an attach request for attachment of a terminal, determining a centralized-services applicability for the terminal, selecting a switching entity for handling the attach request out of a pool of switching entities such that the selected switching entity has a centralized-services capability matching the determined centralized-services applicability for the terminal, said pool of switching entities being configured to control radio resources for a same radio network area, and directing the requested attachment to the selected switching entity having the centralized-services capability matching the determined centralized-services applicability for the terminal.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to any one of the aforementioned method-related example aspects of the present invention.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, an overlay implementation of a centralized service network system, such as an ICS-based system, is enabled/realized.

By way of exemplifying embodiments of the present invention, there is enabled/realized an overlay implementation of an ICS-based system, which obviates the need to replace or upgrade all MSC servers in the communication infrastructure while ensuring that each ICS-capable/ICS-incapable UE is serviceable (i.e. able to connect to or be accessible via a circuit-switched radio access network) by means of respective radio resources.

BRIEF DESCRIPTION OF THE DRAWINGS

In the following, the present invention will be described in greater detail by way of non-limiting examples with reference to the accompanying drawings, in which.

DETAILED DESCRIPTION

Figure 1:
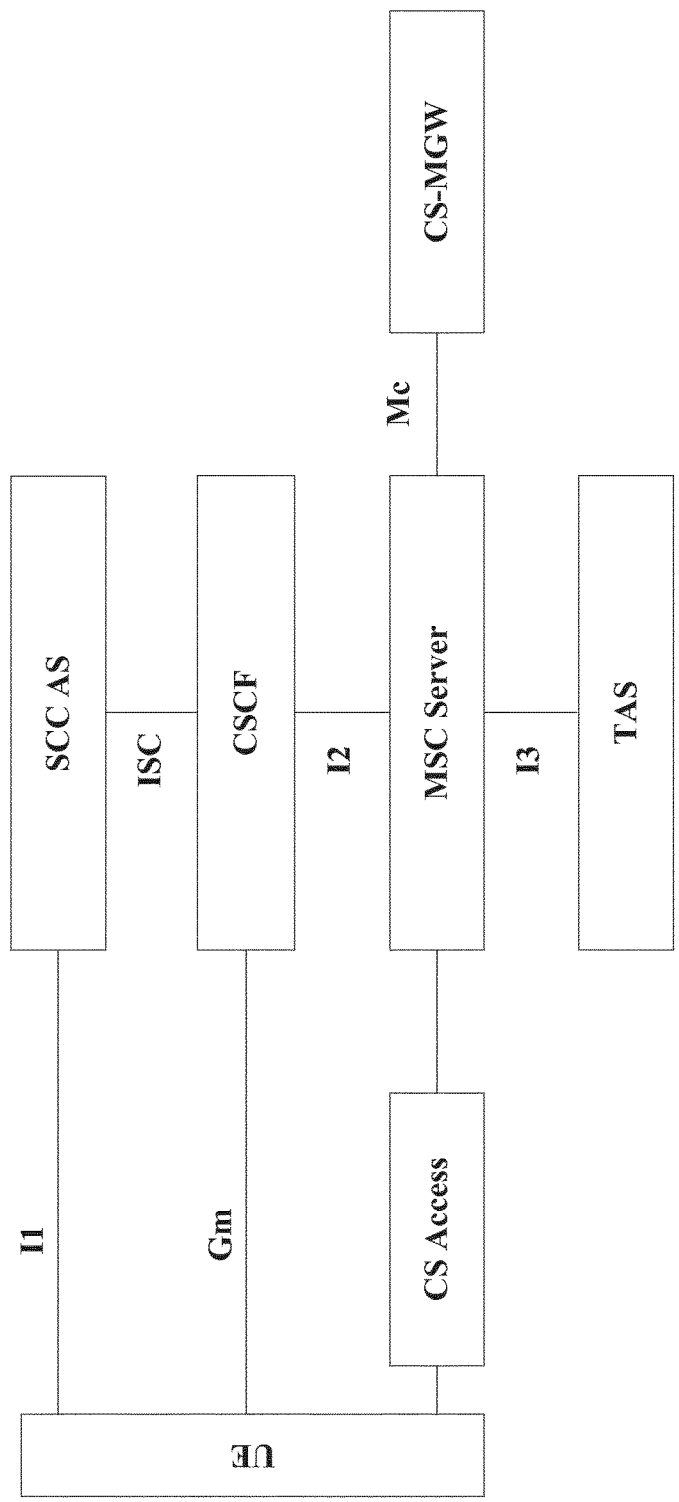
FIG. 1 shows a schematic diagram illustrating a centralized service architecture, for which exemplifying embodiments of the present invention are applicable.

The present invention is described herein with reference to particular non-limiting examples and to what are presently considered to be conceivable embodiments of the present invention. A person skilled in the art will appreciate that the invention is by no means limited to these examples and embodiments, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP specifications being used as non-limiting examples for certain exemplifying network configurations and deployments. In particular, for explaining applicability of exemplifying embodiments of the present invention in an illustrative manner, an EPS/ICS-based system is used as a non-limiting example of a centralized service network system. As such, the description of exemplifying embodiments given herein specifically refers to terminology which is directly related thereto. Such terminology is only used in the context of the presented non-limiting examples and embodiments, and does naturally not limit the invention in any way. Rather, any other network configuration or system deployment, etc. may also be utilized as long as complying with what is described herein and/or exemplifying embodiments described herein are applicable to it.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for enabling/realizing an overlay implementation of a centralized service network system, such as an ICS-based system. Such measures and mechanisms are applicable in any communication system in which centralized services could be provided/executed on the basis of a registration of a switching entity as a contact point for a terminal.

According to exemplifying embodiments of the present invention, a same or corresponding/equivalent pool of switching entities is configured for controlling radio resources for a same or corresponding/equivalent radio network area, i.e. radio resources of a pool area, wherein each such pool comprises one or more switching entities having central-services capability, i.e. at least one switching entity which is enhanced for supporting a centralized-services concept, such as an ICS MSS, and one or more switching entities having no central-services capability, such as a legacy MSS. Based on such pooling configuration, each terminal requesting attachment to the system can be registered to an appropriate switching entity depending on the central-services applicability for the terminal, thus ensuring that each terminal is serviceable (i.e. able to connect to or be accessible via a circuit-switched radio access network). That is, it is facilitated that a terminal with central-services applicability, such as an ICS UE or a UE being used by an ICS user/subscriber, is registered to a switching entity having central-services capability, such as an ICS MSS, and a terminal with no central-services applicability, such as a legacy UE, is registered to a switching entity having no central-services capability, such as a legacy MSS. Thereby, an overlay implementation of a centralized service network system, such as an ICS-based system, can be achieved in that one or more central-services-capable switching entities are provided for each pool of radio network areas and an attach request of a terminal is processed by an appropriate switching entity in each pool of radio network areas.

According to exemplifying embodiments of the present invention, a same or corresponding/equivalent pool of switching entities may comprise a set of one or more switching entities, which are identifiable or denotable by a common identifier or the like, and a same or corresponding/equivalent radio network area may comprise a radio network area, which is identifiable or denotable by a common identifier or the like, such as e.g. a common LAI.

Figure 2:
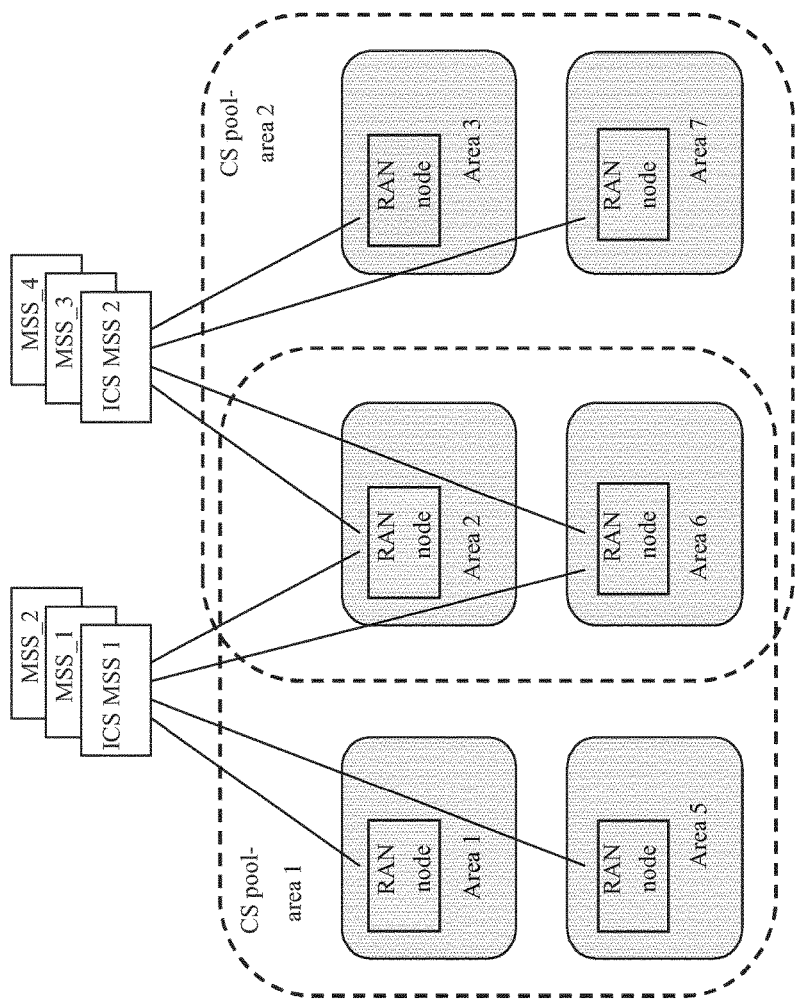
FIG. 2 shows a schematic diagram illustrating an example of a pooling configuration according to exemplifying embodiments of the present invention.

FIG. 2 shows a schematic diagram illustrating an example of a pooling configuration according to exemplifying embodiments of the present invention. Such pooling configuration may be a pooling configuration according to 3GPP TS 23.236.

As shown in FIG. 2, radio resources of the circuit-switched access may be configured into different pool areas, and each pool area may be controlled by a pool of MSSs, i.e. at least one ICS MSS and at least one legacy (non-ICS) MSS. That is, each MSS in a MSS pool is configured to control radio resources of a same or corresponding/equivalent radio network area (denoted as "area" in FIG. 2), i.e. a service area of one or more a same or corresponding/equivalent RAN nodes. The radio resources of the individual MSS pools may also overlap such that the radio resources of a specific radio network area may be controlled by different MSS pools.

A pool area is an area within which a UE may roam without need to change the serving MSS. A RAN node may for example, without limitation, be an RNC or a BSC, and all cells controlled by such RAN node belong to a same or corresponding/equivalent one (or more) pool area(s).

As a matter of course, it is to be noted that the illustrated pooling functionality is depicted by way of example only, and the present invention is not limited with regard to the number of pools or pool areas, the number of areas per pool, the number of (ICS and/or non-ICS) MSSs per pool, or the like.

Figure 3:
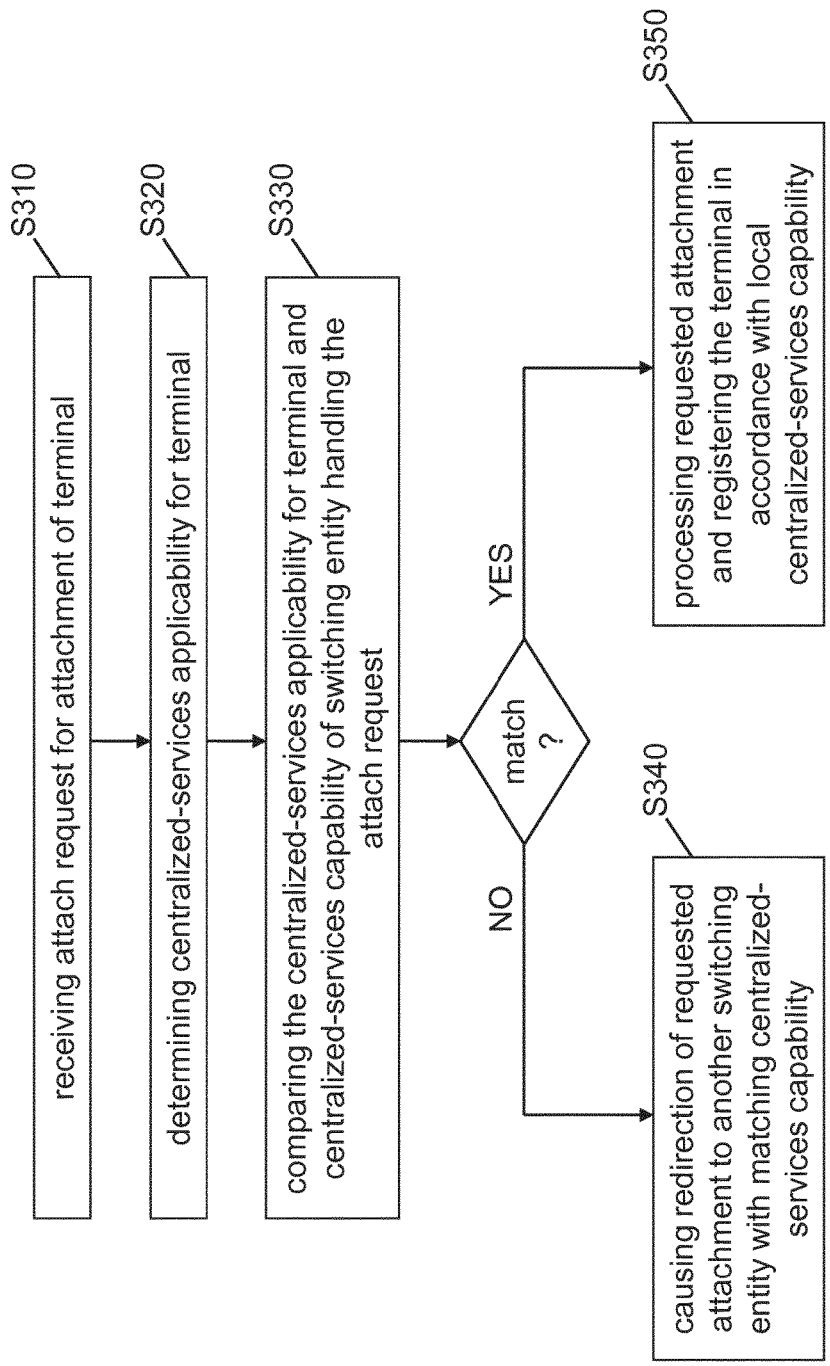
FIG. 3 shows a flowchart illustrating a first example of a method according to exemplifying embodiments of the present invention.

FIG. 3 shows a flowchart illustrating a first example of a method according to exemplifying embodiments of the present invention. The method of FIG. 3 is operable in a central service network system, such as an ICS system, especially at a switching entity with a radio resource control function, such as a mobile switching system, a mobile switching center or a mobile switching center server system of/in an IMS/ICS system.

As shown in FIG. 3, such method according to exemplifying embodiments of the present invention comprises an operation (S310) of receiving an attach request for attachment of a terminal, an operation (S320) of determining a centralized-services applicability, such as ICS applicability, for the terminal, and an operation (S330) of comparing the determined centralized-services applicability, such as the ICS applicability, for the terminal and a centralized-services capability, such as ICS capability, of a switching entity handling the attach request. In case of a mismatch between the determined centralized-services applicability for the terminal and the centralized-services capability of the switching entity, such method according to exemplifying embodiments of the present invention further comprises an operation (S340) of causing redirection of the requested attachment to another switching entity having a centralized-services capability matching the determined centralized-services applicability for the terminal, wherein the another switching entity belongs to a same or corresponding/equivalent pool of switching entities as the switching entity handling the attach request, said pool of switching entities being configured to control radio resources for a same or corresponding/equivalent radio network area. In case of a match between the determined centralized-services applicability for the terminal and the centralized-services capability of the switching entity, such method according to exemplifying embodiments of the present invention further comprises an operation (S350) of processing the requested attachment and registering the terminal by the switching entity handling the attach request in accordance with its centralized-services capability.

According to exemplifying embodiments of the present invention, the centralized-services applicability for the terminal may comprise at least one of a centralized-services capability of the terminal and a centralized-services subscription of the user of the terminal. That is, the applicability of central services for the terminal is determined when the terminal as such is centralized-services-capable, e.g. an ICS(-capable) UE, and/or the user of the terminal is a centralized-services user/subscriber, i.e. an ICS user/subscriber.

According to exemplifying embodiments of the present invention, determining the centralized-services applicability for the terminal may comprise downloading terminal- and/or user-related data from a home location register (HLR) or a home subscriber server (HSS) and evaluating the downloaded terminal- and/or user-related data in terms of indications for the applicability of centralized services for the terminal. For example, when the downloaded terminal- and/or user-related data comprises an ICS flag or an ICS flag is set, it may be determined that central services (of an ICS system) are applicable for the terminal. Additionally or alternatively, the applicability of central services (of an ICS system) for the terminal may be determined on the basis of a specific identifier of the terminal, such as the IMEI, classmark information of the terminal, or the like, for example.

Figure 4:
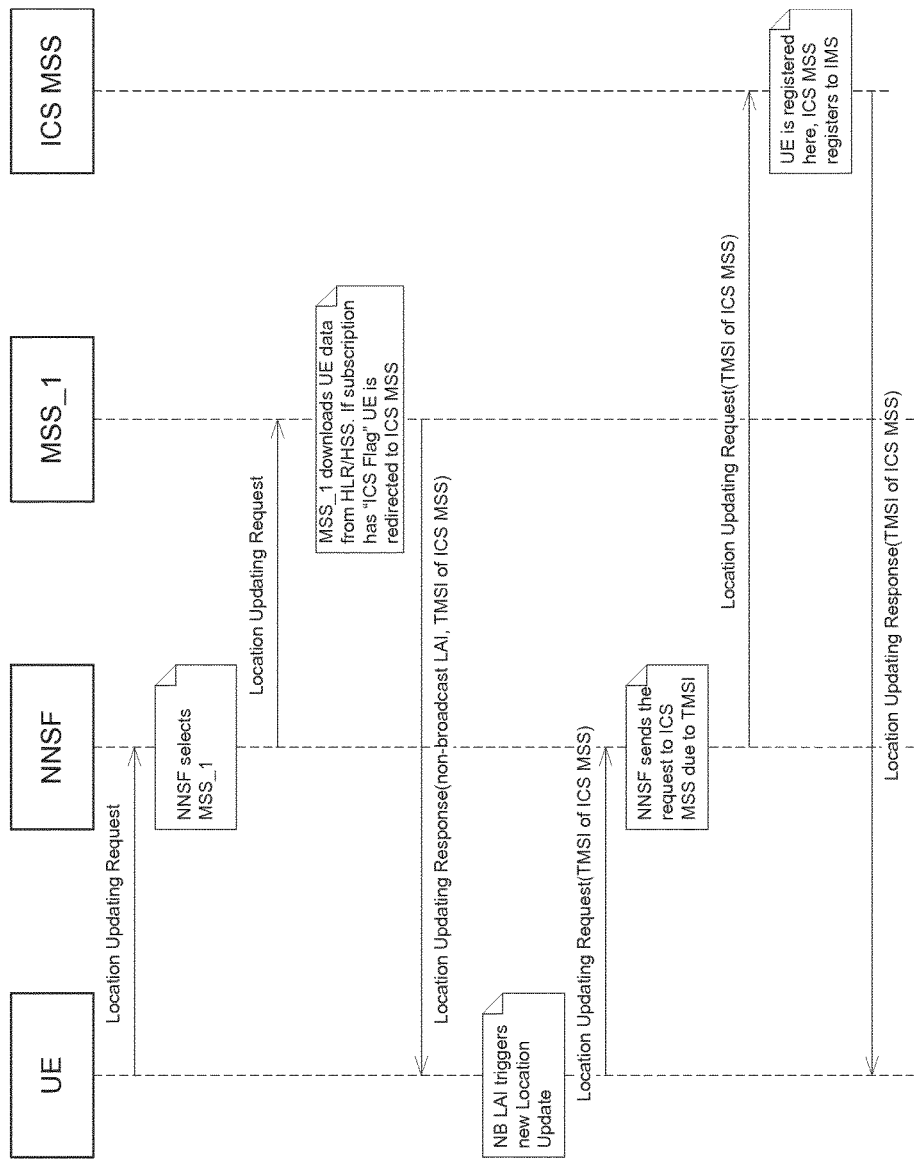
FIG. 4 shows a diagram illustrating a first example of a procedure on the basis of the method of FIG. 3 according to exemplifying embodiments of the present invention.

FIG. 4 shows a diagram illustrating a first example of a procedure on the basis of the method of FIG. 3 according to exemplifying embodiments of the present invention.

Generally speaking, the procedure of FIG. 4 illustrates an approach based on initial selection of a switching entity without centralized-services capability and attach redirection (as needed).

In the example of FIG. 4, it is exemplarily assumed that a terminal is an UE with ICS ability, i.e. an ICS UE, and a MSS pool for the radio network area in which the terminal resides when requesting attachment/registration comprises a legacy (non-ICS) MSS denoted as MSS_1 and a MSS with ICS functionality, i.e. a MSS enhanced for ICS, denoted as ICS MSS. In this example, the NNSF does not need any new logic or functionality, but just shares/distributes the incoming attachment/registration requests among all MSSs in the relevant MSS pool for the radio network area in which the terminal resides.

In such exemplary case, as it is assumed that the UE is ICS-capable or the UE's user is an ICS user/subscriber, the UE requesting attachment/registration shall be attached to or registered with the ICS MSS. According to exemplifying embodiments of the present invention, when the UE attaches to the network and the MSS selected by the NNSF is not ICS-capable, the MSS shall be able to redirect the attach request to an ICS MSS in a same or corresponding/equivalent pool, if the UE is ICS-able.

As shown in FIG. 4, the UE requests attachment via CS access by transmitting a location updating request to the NNSF. Upon receipt thereof, the NNSF is exemplarily assumed to select MSS_1 for handling the location updating request, and forwards the location updating request to the selected MSS_1. Upon receipt thereof, the MSS_1 determines the UE's ICS ability and compares the same with its own ICS capability. For determining the UE's ICS ability, the MSS_1 may fetch (download) UE- and/or user-related information from the HLR/HSS of the UE/user (depending on the underlying system configuration) during the location update procedure, i.e. when the MSS_1 downloads all other subscription data from the HLR/HSS during the registration of the UE. Then, the MSS_1 may evaluate the thus fetched (downloaded) UE- and/or user-related information in terms of indications for the ICS applicability for the UE. In this regard, the thus fetched (downloaded) UE- and/or user-related information may comprise an ICS flag, wherein either presence of such ICS flag or setting of such ICS flag may indicate the ICS ability for the UE. Additionally or alternatively, the thus fetched (downloaded) UE- and/or user-related information may comprise an identity of the UE, such as its IMEI, classmark information of the UE, or the like, which may serve to evaluate for deriving an indication of the ICS ability for the UE.

In the present case, as the UE has ICS ability (as exemplarily indicated by way of presence of an ICS flag) but the MSS_1 does not have ICS capability, i.e. there is a mismatch between the ICS ability for the UE and the ICS capability of the MSS_1, a need for redirection of the requested attachment, i.e. the location updating request, to the ICS MSS is detected. Accordingly, the MSS_1 causes redirection of the requested attachment, i.e. the location updating request, to the ICS MSS. In this regard, the MSS_1 may issue (and transmit) a location updating response as an attach response to the UE. Such location updating response comprises a non-broadcast LAI of the MSS_1 and a TMSI for the ICS MSS, which is assigned for the UE. The non-broadcast LAI of the MSS_1 serves as an indication that the previous attach request cannot be properly handled and is to be redirected. To this end, each MSS in the respective pool has a unique non-broadcast LAI for use in case it wants to be offloaded, and each MSS in the respective pool is aware of the non-broadcast LAI assigned to the other MSS in the respective pool so as to be able to retrieve data (e.g. IMSI, security context, MM & PDP contexts) from the offloaded MSS based on non-broadcast LAI. The TMSI for the ICS MSS, which is assigned for the UE, serves for designating the ICS MSS as a handling target for a subsequent attach request, i.e. a subsequent location updating request, of the UE. The TMSI may contain the NRI of the ICS MSS Upon receipt of the location updating response from the MSS_1, due to the presence of the non-broadcast (NB) LAI/, the UE will restart the attach procedure. To this end, the UE issues (and transmits) a new location updating request as a subsequent attach request using the received TMSI for the ICS MSS. Upon receipt thereof, the NNSF selects ICS MSS for handling the location updating request (as a result of the indication of the TMSI, potentially containing the NRI of the ICS MSS), and forwards the location updating request to the selected ICS MSS. The forwarded location updating request also contains the TMSI for the ICS MSS, so the ICS MSS may recognize that this location updating request is addressed/intended for itself. Upon receipt thereof, the ICS MSS then processes the requested attachment and registers the UE in accordance with its ICS capability, i.e. using ICS functionality. Hence, the UE is registered to the ICS MSS, and the radio resources for network attachment of the UE may be controlled by the ICS MSS accordingly. In the present case of an ICS UE and handling of its attach request by an ICS MSS (after redirection), the UE is registered to the ICS MSS and the ICS MSS is registered as a contact point for centralized services for the UE at an application server for centralized services provision, such as a SCC-AS. Thereupon, the ICS MSS may issue (and transmit) a location updating response to the UE as a confirmation of the successful attachment/registration of the UE. Such confirming location updating response may comprise the TMSI for the ICS MSS.

Assuming that the terminal is an UE without ICS ability, i.e. a non-ICS UE, and the NNSF is exemplarily assumed to select the legacy (non-ICS) MSS, i.e. MSS_1, a redirection would not be needed. Rather, upon receipt of the location update request from the NNSF, the MSS_1 detects a match between the ICS ability for the UE and the ICS capability of the MSS_1, and the MSS_1 then processes the requested attachment and registers the UE in accordance with its ICS non-capability, i.e. without using ICS functionality. In such case, the UE is registered to the MSS_1, and the radio resources for network attachment of the UE may be controlled by the MSS_1 accordingly. Thereupon, the MSS_1 may issue (and transmit) a location updating response to the UE as a confirmation of the successful attachment/registration of the UE. Such confirming location updating response may comprise the TMSI for the MSS_1.

In the procedure of FIG. 4, an incoming attach request can still be shared/distributed among all MSS in a respective pool (by way of corresponding selections by the NNSF), so the attachment/registration load is not concentrated on a single (or some) MSS. Yet, it is based on a modified/enhanced functionality of a (or some) legacy (non-ICS) MSS (i.e. the MSS or MSSs initially selectable as a handling target).

Figure 5:
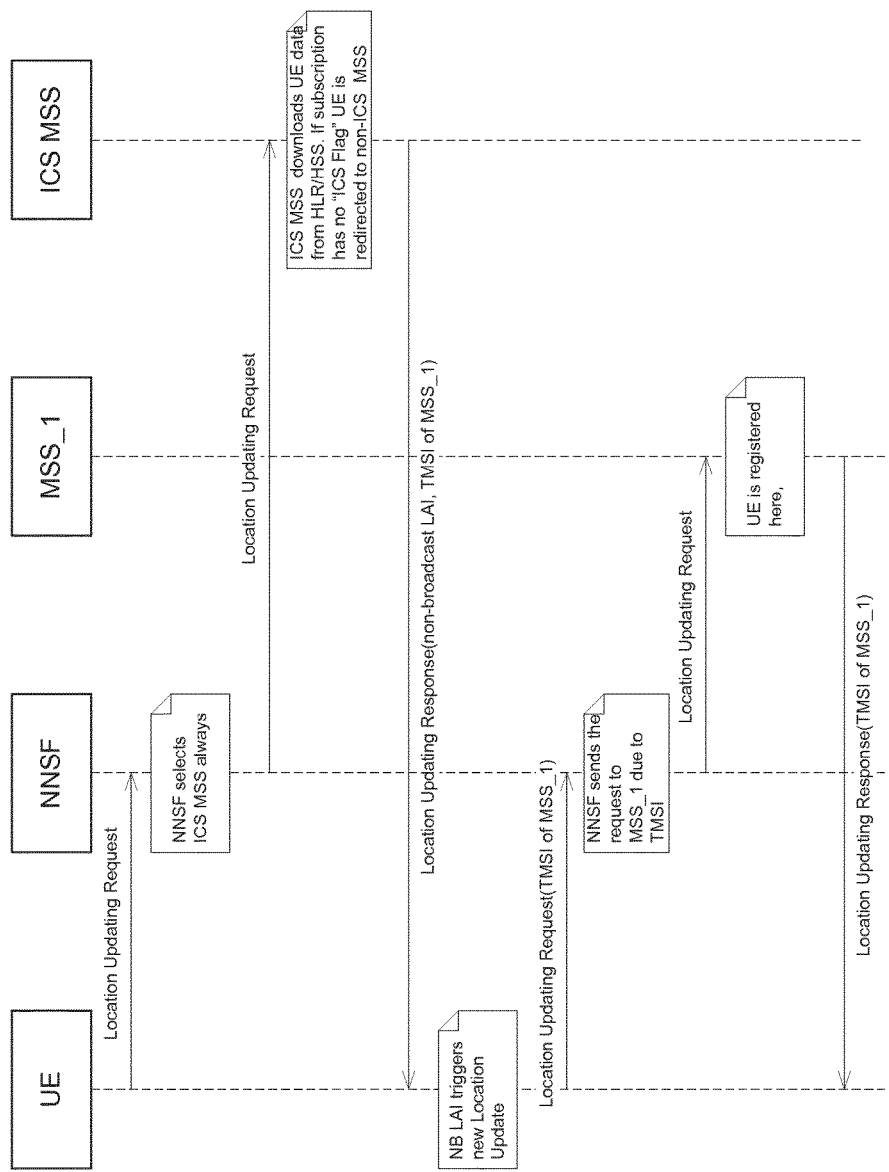
FIG. 5 shows a diagram illustrating a second example of a procedure on the basis of the method of FIG. 3 according to exemplifying embodiments of the present invention.

FIG. 5 shows a diagram illustrating a second example of a procedure on the basis of the method of FIG. 3 according to exemplifying embodiments of the present invention.

Generally speaking, the procedure of FIG. 5 illustrates an approach based on initial selection (e.g. by default) of a switching entity with centralized-services capability and attach redirection or fallback (as needed).

In the example of FIG. 5, it is exemplarily assumed that a terminal is an UE without ICS ability, i.e. a non-ICS UE, and a MSS pool for the radio network area in which the terminal resides when requesting attachment/registration comprises a legacy (non-ICS) MSS denoted as MSS_1 and a MSS with ICS functionality, i.e. a MSS enhanced for ICS, denoted as ICS MSS. In this example, the NNSF may have a new logic or functionality. Namely, rather than just sharing/distributing the incoming attachment/registration requests among all MSSs in the relevant MSS pool for the radio network area in which the terminal resides, it may be exemplarily assumed that the NNSF is configured to select the MSS with ICS functionality, i.e. the ICS MSS, by default, i.e. when there is no specific indication/direction for preference of selecting the MSS_1.

In such exemplary case, as it is assumed that the UE is ICS-incapable or the UE's user is not an ICS user/subscriber, the UE requesting attachment/registration shall be attached to or registered with the MSS_1. According to exemplifying embodiments of the present invention, when the UE attaches to the network and the MSS selected by the NNSF is ICS-capable, the MSS shall be able to redirect the attach request to a non-ICS MSS in a same or corresponding/equivalent pool, if the UE is ICS-unable.

As shown in FIG. 5, the UE requests attachment via CS access by transmitting a location updating request to the NNSF. Upon receipt thereof, the NNSF is exemplarily assumed to select ICS MSS (e.g. as a default setting) for handling the location updating request, and forwards the location updating request to the selected ICS MSS. Upon receipt thereof, the ICS MSS determines the UE's ICS ability and compares the same with its own ICS capability. For determining the UE's ICS ability, the ICS MSS may fetch (download) UE- and/or user-related information from the HLR/HSS of the UE/user (depending on the underlying system configuration) during the location update procedure, i.e. when the ICS MSS downloads all other subscription data from the HLR/HSS during the registration of the UE. Then, the ICS MSS may evaluate the thus fetched (downloaded) UE- and/or user-related information in terms of indications for the ICS applicability for the UE. In this regard, the thus fetched (downloaded) UE- and/or user-related information may comprise an ICS flag, wherein either presence of such ICS flag or setting of such ICS flag may indicate the ICS ability for the UE. Additionally or alternatively, the thus fetched (downloaded) UE- and/or user-related information may comprise an identity of the UE, such as its IMEI, classmark information of the UE, or the like, which may serve to evaluate for deriving an indication of the ICS ability for the UE.

In the present case, as the UE does not have ICS ability (as exemplarily indicated by way of non-presence of an ICS flag) but the ICS MSS has ICS capability, i.e. there is a mismatch between the ICS ability for the UE and the ICS capability of the ICS MSS, a need for redirection or fallback of the requested attachment, i.e. the location updating request, to the MSS_1 is detected. Accordingly, the ICS MSS causes redirection or fallback of the requested attachment, i.e. the location updating request, to the MSS_1. In this regard, the ICS MSS may issue (and transmit) a location updating response as an attach response to the UE. Such location updating response comprises a non-broadcast LAI of the ICS MSS and a TMSI for the MSS_1, which is assigned for the UE. The non-broadcast LAI of the ICS MSS serves as an indication that the previous attach request cannot be properly handled and is to be redirected. To this end, each MSS in the respective pool has a unique non-broadcast LAI for use in case it wants to be offloaded, and each MSS in the respective pool is aware of the non-broadcast LAI assigned to the other MSS in the respective pool so as to be able to retrieve data (e.g. IMSI, security context, MM & PDP contexts) from the offloaded MSS based on non-broadcast LAI. The TMSI for the MSS_1, which is assigned for the UE, serves for designating the MSS_1 as a handling target for a subsequent attach request, i.e. a subsequent location updating request, of the UE. The TMSI may contain the NRI of the MSS_1.

Upon receipt of the location updating response from the ICS MSS, due to the presence of the non-broadcast (NB) LAI, the UE will restart the attach procedure. To this end, the UE issues (and transmits) a new location updating request as a subsequent attach request using the received TMSI for the MSS_1. Upon receipt thereof, the NNSF selects MSS_1 for handling the location updating request (as a result of the indication of the TMSI, potentially containing the NRI of the MSS_1), and forwards the location updating request to the selected MSS_1. The forwarded location updating request also contains the TMSI for the MSS_1, so the MSS_1 may recognize that this location updating request is addressed/intended for itself. Upon receipt thereof, the MSS_1 then processes the requested attachment and registers the UE in accordance with its ICS non-capability, i.e. without using ICS functionality. Hence, the UE is registered to the MSS_1, and the radio resources for network attachment of the UE may be controlled by the MSS_1 accordingly. In the present case of a non-ICS UE and handling of its attach request by an MSS_1 (after redirection or fallback), the UE is registered to the MSS_1. Thereupon, the MSS_1 may issue (and transmit) a location updating response to the UE as a confirmation of the successful attachment/registration of the UE. Such confirming location updating response may comprise the TMSI for the MSS_1.

Assuming that the terminal is an UE with ICS ability, i.e. an ICS UE, while the exemplarily selection or the default setting of the NNSF is the selection of the ICS-capable MSS, i.e. ICS MSS, a redirection or fallback would not be needed. Rather, upon receipt of the location update request from the NNSF, the ICS MSS detects a match between the ICS ability for the UE and the ICS capability of the ICS MSS, and the ICS MSS then processes the requested attachment and registers the UE in accordance with its ICS capability, i.e. using ICS functionality. In such case, the UE is registered to the ICS MSS, and the radio resources for network attachment of the UE may be controlled by the ICS MSS accordingly. In the present case of an ICS UE and handling of its attach request by an ICS MSS, the UE is registered to the ICS MSS and the ICS MSS is registered as a contact point for centralized services for the UE at an application server for centralized services provision, such as a SCC-AS. Thereupon, the ICS MSS may issue (and transmit) a location updating response to the UE as a confirmation of the successful attachment/registration of the UE. Such confirming location updating response may comprise the TMSI for the ICS MSS.

In the procedure of FIG. 5, all incoming attach requests can be concentrated on a single (or some) ICS-capable MSS in a respective pool (by way of a corresponding selection by the NNSF). Yet, it is based on a modified/enhanced functionality of a (or some) ICS-capable MSS (i.e. the MSS or MSSs selectable as a handling target by default), while not requiring any modification/enhancement to one (or some) legacy (non-ICS) MSS.

Both procedures exemplified in FIGS. 4 and 5 are operable in the network where the terminal currently resides. That is, these procedures are equally applicable in the HPLMN, i.e. the terminal's/user's home network domain, and, in case of roaming situations, in the VPLMN, i.e. the network domain in which the terminal/user roams. In an inter-PLMN (roaming) scenario, the necessary subscription data may preferably be fetched (downloaded) from a HLR rather than a HSS, as the MSS-HLR interface typically supports roaming situations natively (i.e. the classic solution for storing subscription data to be used in an MSS is a HLR based solution).

Figure 6:
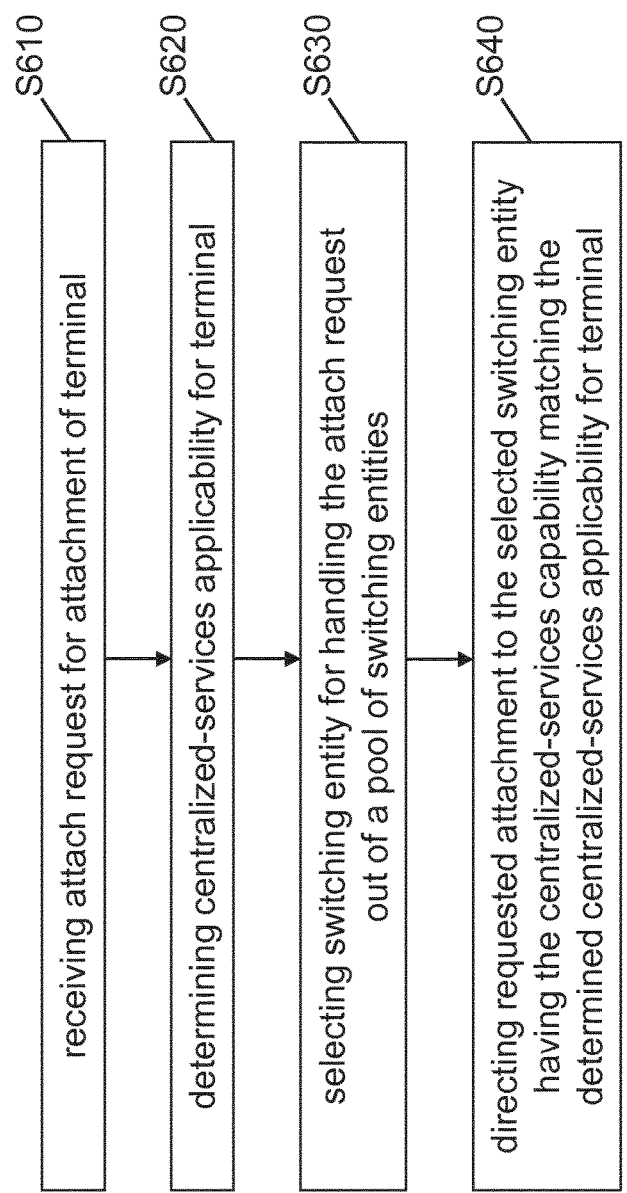
FIG. 6 shows a flowchart illustrating a second example of a method according to exemplifying embodiments of the present invention.

FIG. 6 shows a flowchart illustrating a second example of a method according to exemplifying embodiments of the present invention. The method of FIG. 6 is operable in a central service network system, such as an ICS system, especially at an intermediate node between a radio network domain and a core network domain, such as (a network node having) a network node selection function of/in an IMS/ICS system.

As shown in FIG. 6, such method according to exemplifying embodiments of the present invention comprises an operation (S610) of receiving an attach request for attachment of a terminal, an operation (S620) of determining a centralized-services applicability, such as ICS applicability, for the terminal, an operation (S630) of selecting a switching entity for handling the attach request out of a pool of switching entities such that the selected switching entity has a centralized-services capability, such as ICS capability, matching the determined centralized-services applicability, such as ICS ability, for the terminal, said pool of switching entities being configured to control radio resources for a same or corresponding/equivalent radio network area, and an operation (S640) of directing the requested attachment to the selected switching entity having the centralized-services capability matching the determined centralized-services applicability for the terminal.

According to exemplifying embodiments of the present invention, the centralized-services applicability for the terminal may comprise at least one of a centralized-services capability of the terminal and a centralized-services subscription of the user of the terminal. That is, the applicability of central services for the terminal is determined when the terminal as such is centralized-services-capable, e.g. an ICS(-capable) UE, and/or the user of the terminal is a centralized-services user/subscriber, i.e. an ICS user/subscriber.

According to exemplifying embodiments of the present invention, determining the centralized-services applicability for the terminal may comprise downloading terminal- and/or user-related data from a home location register (HLR) or a home subscriber server (HSS) and evaluating the downloaded terminal- and/or user-related data in terms of indications for the applicability of centralized services for the terminal. For example, when the downloaded terminal- and/or user-related data comprises an ICS flag or an ICS flag is set, it may be determined that central services (of an ICS system) are applicable for the terminal. Additionally or alternatively, the applicability of central services (of an ICS system) for the terminal may be determined on the basis of a specific identifier of the terminal, such as the IMEI, classmark information of the terminal, or the like, for example.

Figure 7:
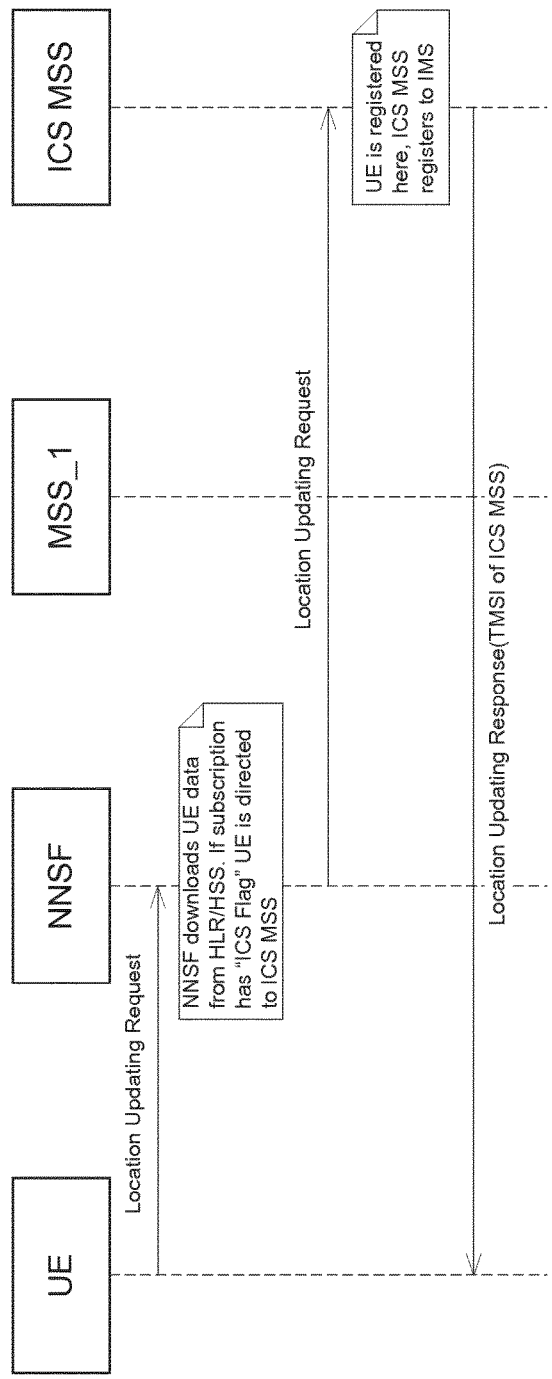
FIG. 7 shows a diagram illustrating an example of a procedure on the basis of the method of FIG. 6 according to exemplifying embodiments of the present invention.

FIG. 7 shows a diagram illustrating an example of a procedure on the basis of the method of FIG. 6 according to exemplifying embodiments of the present invention.

Generally speaking, the procedure of FIG. 7 illustrates an approach based on an appropriate selection of a switching entity on the basis of a terminal's centralized-services ability.

In the example of FIG. 7, it is exemplarily assumed that a terminal is an UE with ICS ability, i.e. an ICS UE, and a MSS pool for the radio network area in which a terminal resides when requesting attachment comprises a legacy (non-ICS) MSS denoted as MSS_1 and a MSS with ICS functionality, i.e. a MSS enhanced for ICS, denoted as ICS MSS.

In such exemplary case, depending on the ICS capability of the UE or the ICS usage/subscription status of the UE's user, the UE requesting attachment shall be registered with an appropriate MSS. According to exemplifying embodiments of the present invention, when the UE attaches to the network, the NNSF selects an appropriate MSS, i.e. an ICS MSS of a respective pool, if the UE is ICS-able, or a legacy (non-ICS) MSS of a respective pool, if the UE is ICS-unable.

As shown in FIG. 7, the UE requests attachment via CS access by transmitting a location updating request to the NNSF. Upon receipt thereof, the NNSF determines the UE's ICS ability, and selects an appropriate MSS with a matching ICS capability based thereon. For determining the UE's ICS ability, the NNSF may fetch (download) UE- and/or user-related information from the HLR/HSS of the UE/user (depending on the underlying system configuration) during the location update procedure, e.g. when the NNSF downloads all other subscription data from the HLR/HSS during the registration of the UE. Then, the NNSF may evaluate the thus fetched (downloaded) UE- and/or user-related information in terms of indications for the ICS applicability for the UE. In this regard, the thus fetched (downloaded) UE- and/or user-related information may comprise an ICS flag, wherein either presence of such ICS flag or setting of such ICS flag may indicate the ICS ability for the UE. Additionally or alternatively, the thus fetched (downloaded) UE- and/or user-related information may comprise an identity of the UE, such as its IMEI, classmark information of the UE, or the like, which may serve to evaluate for deriving an indication of the ICS ability for the UE.

In the present case, as the UE is determined to have ICS ability (as exemplarily indicated by way of presence of an ICS flag), the NNSF selects the ISC MSS, i.e. an MSS with a matching ICS capability, and forwards the location updating request to the selected ICS MSS. The forwarded location updating request may contain the TMSI for the ICS MSS, so the ICS MSS may recognize that this location updating request is addressed/intended for itself. Upon receipt thereof, the ICS MSS then processes the requested attachment and registers the UE in accordance with its ICS capability, i.e. using ICS functionality. Hence, the UE is registered to the ICS MSS, and the radio resources for network attachment of the UE may be controlled by the ICS MSS accordingly. In the present case of an ICS UE and handling of its attach request by an ICS MSS (upon appropriate selection), the UE is registered to the ICS MSS and the ICS MSS is registered as a contact point for centralized services for the UE at an application server for centralized services provision, such as a SCC-AS. Thereupon, the ICS MSS may issue (and transmit) a location updating response to the UE as a confirmation of the successful attachment/registration of the UE. Such confirming location updating response may comprise the TMSI for the ICS MSS.

Assuming that the terminal is an UE without ICS ability, i.e. a non-ICS UE, the UE is determined by the NNSF to have no ICS ability (as exemplarily indicated by way of non-presence of an ICS flag). Then, the NNSF selects the MSS_1, i.e. an MSS with a matching ICS capability, and forwards the location updating request to the selected MSS_1. The forwarded location updating request may contain the TMSI for the MSS_1, so the MSS_1 may recognize that this location updating request is addressed/intended for itself. Upon receipt thereof, the MSS_1 then processes the requested attachment and registers the UE in accordance with its ICS incapability, i.e. without using ICS functionality. Hence, the UE is registered to the MSS_1, and the radio resources for network attachment of the UE may be controlled by the MSS_1 accordingly. Thereupon, the MSS_1 may issue (and transmit) a location updating response to the UE as a confirmation of the successful attachment/registration of the UE. Such confirming location updating response may comprise the TMSI for the MSS_1.

In the procedure of FIG. 7, an intermediate node arranged between a radio network domain and a core network domain and having a network node selection function is configured to appropriately distribute an incoming attach request to a matching MSS in a respective pool. Such NNSF entity may for example be realized in/by a MGW and/or BSC/BTS/RNC/NodeB/eNodeB.

The procedure exemplified in FIG. 7 is operable in the network where the terminal currently resides. That is, this procedure is equally applicable in the HPLMN, i.e. the terminal's/user's home network domain, and, in case of roaming situations, in the VPLMN, i.e. the network domain in which the terminal/user roams. In an inter-PLMN (roaming) scenario, the necessary subscription data may preferably be fetched (downloaded) from a HLR rather than a HSS, as the MSS-HLR interface typically supports roaming situations natively (i.e. the classic solution for storing subscription data to be used in an MSS is a HLR based solution).

By virtue of exemplifying embodiments of the present invention, as evident from the above, an overlay implementation of a centralized service network system, such as an ICS-based system, is enabled/realized. Such overlay implementation of an ICS-based system obviates the need to replace or upgrade all MSC servers in the communication infrastructure while ensuring that each ICS-capable/ICS-incapable UE is serviceable (i.e. able to connect to or be accessible via a circuit-switched radio access network) by means of respective radio resources.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIG. 8, while for the sake of brevity reference is made to the detailed description of respective corresponding configurations/setups, schemes, methods and functionality, principles and operations according to FIGS. 1 to 7.

Figure 8:
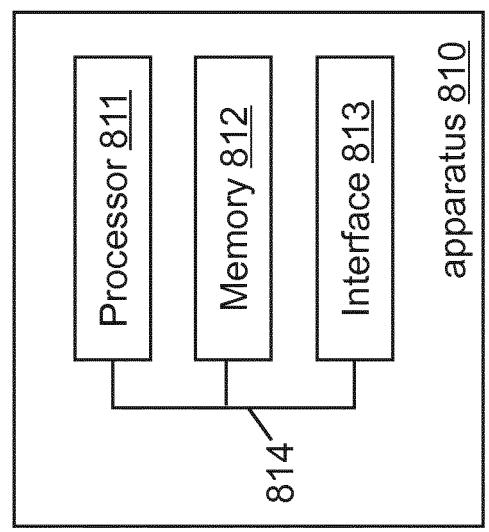
FIG. 8 shows a schematic diagram illustrating an example of a structure of apparatuses according to exemplifying embodiments of the present invention.

FIG. 8 shows a schematic diagram illustrating an example of a structure of apparatuses according to exemplifying embodiments of the present invention.

In FIG. 8, the solid line blocks are basically configured to perform respective methods, procedures and/or functions as described above. The entirety of solid line blocks are basically configured to perform the methods, procedures and/or functions as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 8, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

As indicated in FIG. 8, according to exemplifying embodiments of the present invention, an apparatus 810 may comprise at least one processor 811 and at least one memory 812 (and possibly also at least one interface 813), which may be operationally connected or coupled, for example by a bus 814 or the like, respectively.

The processor 811 and/or the interface 813 of the apparatus 810 may also include a modem or the like to facilitate communication over a (hardwire or wireless) link, respectively. The interface 813 of the apparatus 810 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 813 of the apparatus 810 is generally configured to communicate with at least one other apparatus, device, node or entity (in particular, the connector thereof).

The memory 812 of the apparatus 810 may represent a (non-transitory/tangible) storage medium and store respective programs, program products, macros or applets, etc. or parts of them, which may be assumed to comprise program instructions or computer program code that, when executed by the respective processor, enables the respective electronic device or apparatus to operate in accordance with the exemplifying embodiments of the present invention.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 810 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. Also, such function is to be construed to be equivalently implementable by specifically configured circuitry or means for performing the respective function.

The thus illustrated apparatus 810 may represent or realize/embody a (part of a) switching entity, such as a MSS, according to exemplifying embodiments of the present invention, and it may be configured to perform a procedure and/or exhibit a functionality as described in FIG. 3 as well as in FIG. 4 (for the MSS_1) and in FIG. 5 (for the ICS MSS).

In this case, the apparatus 810 may be caused or the apparatus 810 or its processor 811 may be (possibly together with computer program code stored in the memory 812), in its most basic form, configured to perform receiving an attach request for attachment of a terminal, determining a centralized-services applicability for the terminal, comparing the determined centralized-services applicability for the terminal and a centralized-services capability of a switching entity handling the attach request, and in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same or corresponding/equivalent pool of switching entities as the switching entity handling the attach request, said pool of switching entities being configured to control radio resources for a same or corresponding/equivalent radio network area.

The thus illustrated apparatus 810 may represent or realize/embody a (part of a) intermediate node, such as a NNSF, according to exemplifying embodiments of the present invention, and it may be configured to perform a procedure and/or exhibit a functionality as described in FIG. 6 as well as in FIG. 7 (for the NNSF).

In this case, the apparatus 810 may be caused or the apparatus 810 or its processor 811 may be (possibly together with computer program code stored in the memory 812), in its most basic form, configured to perform receiving an attach request for attachment of a terminal, determining a centralized-services applicability for the terminal, selecting a switching entity for handling the attach request out of a pool of switching entities such that the selected switching entity has a centralized-services capability matching the determined centralized-services applicability for the terminal, said pool of switching entities being configured to control radio resources for a same or corresponding/equivalent radio network area, and directing the requested attachment to the selected switching entity having the centralized-services capability matching the determined centralized-services applicability for the terminal.

The thus illustrated apparatus 810 may represent or realize/embody a (part of a) terminal, such as a UE, according to exemplifying embodiments of the present invention, and it may be configured to perform a procedure and/or exhibit a functionality as described in any one of FIGS. 4, 5 and 7 (for the UE).

For further details regarding the operability/functionality of the individual apparatuses according to exemplifying embodiments of the present invention, reference is made to the above description in connection with any one of FIGS. 1 to 7, respectively.

As mentioned above, any apparatus according to exemplifying embodiments of the present invention may be structured by comprising respective means for performing corresponding operations, procedures and/or functions. For example, such means may be implemented/realized on the basis of an apparatus structure, as exemplified in FIG. 8, i.e. by one or more processors 811, one or more memories 812, one or more interfaces 813, or any combination thereof.

Although not illustrated, an apparatus according to exemplifying embodiments of the present invention, which is operable as a switching entity, such as a MSS, may comprise (at least) means for receiving an attach request for attachment of a terminal, means for determining a centralized-services applicability for the terminal, means for comparing the determined centralized-services applicability for the terminal and a centralized-services capability of a switching entity handling the attach request, and means for, in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same or corresponding/equivalent pool of switching entities as the switching entity handling the attach request, said pool of switching entities being configured to control radio resources for a same or corresponding/equivalent radio network area.

According to exemplifying embodiments, as described above, it is noted that such apparatus may further comprise one or more of:

means for issuing an attach request response to the terminal, which comprises a non-broadcast location area identifier of the switching entity and a temporary mobile subscriber identity assigned for the terminal for designating the another switching entity as a handling target for a subsequent attach request of the terminal, means for processing the requested attachment and registering the terminal in accordance with its centralized-services capability, and means for determining the centralized-services applicability for the terminal comprises downloading terminal- and/or user-related data from a home location register or a home subscriber server and evaluating the downloaded terminal- and/or user-related data in terms of indications for the applicability of centralized services for the terminal.

Although not illustrated, an apparatus according to exemplifying embodiments of the present invention, which is operable as an intermediate node, such as a NNSF, may comprise (at least) means for receiving an attach request for attachment of a terminal, means for determining a centralized-services applicability for the terminal, means for selecting a switching entity for handling the attach request out of a pool of switching entities such that the selected switching entity has a centralized-services capability matching the determined centralized-services applicability for the terminal, said pool of switching entities being configured to control radio resources for a same or corresponding/equivalent radio network area, and means for directing the requested attachment to the selected switching entity having the centralized-services capability matching the determined centralized-services applicability for the terminal.

According to exemplifying embodiments, as described above, it is noted that such apparatus may further comprise one or more of:

means for forwarding the attach request to the selected switching entity, and means for determining the centralized-services applicability for the terminal comprises downloading terminal- and/or user-related data from a home location register or a home subscriber server and evaluating the downloaded terminal- and/or user-related data in terms of indications for the applicability of centralized services for the terminal.

According to exemplifying embodiments of the present invention, any one of the processor, the memory and the connector, as well as any one of the means, may be implemented as individual modules, chips, chipsets, circuitries or the like, or one or more of them can be implemented as a common module, chip, chipset, system-on-chip, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing an overlay implementation of a centralized service network system. Such measures are based on a centralized-services applicability for a terminal requesting attachment and a centralized-services capability of at least one switching entity out of a pool of switching entities which are configured to control radio resources for a same radio network area. Either in case of a mismatch between the centralized-services applicability for the terminal and the centralized-services capability of the switching entity the requested attachment can be redirected to another switching entity out of said pool, which has a matching centralized-services capability, or a switching entity can be selected out of said pool, which has a matching centralized-services capability, and the requested attachment can be directed to the selected switching entity.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ Generation Partnership Project
BSC Base Station Controller
BTS Base Transceiver Station (GSM base station)
CS Circuit-Switched
CSCF Call State Control Function
CSFB Circuit-Switched Fallback
CS-MGW Circuit-Switched Media Gateway
E-UTRAN Evolved UTRAN
EDGE Enhanced Data rates for Global Evolution
EPS Evolved Packet System
GERAN GSM/EDGE Radio Access Network
GSM Global System for Mobile Communications
HLR Home Location Register
HPLMN Home Public Land Mobile Network
HSS Home Subscriber Server
ICS IMS Centralized Service
IMEI International Mobile Equipment Identity
IMS IP Multimedia Subsystem
IMSI International Mobile Subscriber Identity
IP Internet Protocol
LAI Location Area Identifier
LTE Long Term Evolution
LTE-A Long Term Evolution Advanced
MGW Media Gateway
MM Mobility Management
MSC Mobile Switching Center
MSS MSC Server System
NNSF Network Node Selection Function
NodeB NodeB (UMTS base station)
NRI Network Resource Identifier
PDP Packet Data Protocol
RAN Radio Access Network
RNC Radio Network Controller
SCC-AS Service Centralization and Continuity Application Server
SR-VCC Single Radio Voice Call Continuity
TAS Telephony Application Server
TMSI Temporary Mobile Subscriber Identity
UE User Equipment
UMTS Universal Mobile Telecommunications System
UTRAN UMTS Terrestrial Radio Access Network
VPLMN Visited Public Land Mobile Network

The invention claimed is:

1. A method comprising
receiving an attach request for attachment of a terminal,
determining a centralized-services applicability for the terminal,
comparing the determined centralized-services applicability for the terminal and a centralized-services capability of a switching entity handling the attach request,
in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same pool of switching entities as the switching entity handling the attach request, said pool of switching entities being configured to control radio resources for a same radio network area, and
in case of a match between the determined centralized-services applicability for the terminal and the centralized-services capability of the switching entity, processing the requested attachment and registering the terminal by the switching entity handling the attach request in accordance with its centralized-services capability,
wherein in case of the match being such that centralized services are applicable for the terminal and the switching entity handling the attach request has centralized-services capability, registering the terminal comprises registering of the terminal to the switching entity and registering the switching entity as a contact point for centralized services for the terminal at an application server for centralized services provision.

2. The method according to claim 1, wherein causing redirection of the requested attachment to the another switching entity comprises
issuing an attach request response to the terminal, which comprises a non-broadcast location area identifier of the switching entity and a temporary mobile subscriber identity assigned for the terminal for designating the another switching entity as a handling target for a subsequent attach request of the terminal.

3. The method according to claim 1, wherein
in case of the mismatch being such that centralized services are applicable for the terminal and the switching entity handling the attach request does not have centralized-services capability, the attach request is redirected to another switching entity having centralized-services capability, or
in case of the mismatch being such that centralized services are not applicable for the terminal and the switching entity handling the attach request has centralized-services capability, the attach request is redirected to another switching entity having no centralized-services capability.

4. The method according to claim 1, wherein
the centralized-services applicability for the terminal comprises at least one of a centralized-services capability of the terminal and a centralized-services subscription of the user of the terminal, or
determining the centralized-services applicability for the terminal comprises downloading terminal- or user-related data from a home location register or a home subscriber server and evaluating the downloaded terminal- or user-related data in terms of indications for the applicability of centralized services for the terminal.

5. The method according to claim 1, wherein
the attach request requests attachment of the terminal via circuit-switched access, or
the attach request comprises a location updating request.

6. The method according to claim 1, wherein
the centralized services comprise IP multimedia subsystem centralized services, or a switching entity comprises one of a mobile switching system, a mobile switching center and a mobile switching center server system of an IP multimedia subsystem centralized service system.

7. The method according to claim 1, wherein
the method is operable at or by the switching entity handling the attach request, or
the method is operable in an IP multimedia subsystem centralized service system.

8. An apparatus comprising
a processor, and
a memory configured to store computer program code,
wherein the processor is configured to cause the apparatus to perform:
receiving an attach request for attachment of a terminal,
determining a centralized-services applicability for the terminal,
comparing the determined centralized-services applicability for the terminal and a centralized-services capability of a switching entity handling the attach request,
in case of a mismatch between the determined centralized-services applicability for the terminal and the centralized-services capability of the switching entity, causing redirection of the requested attachment to another switching entity having a centralized-services capability matching the determined centralized-services applicability for the terminal, wherein the another switching entity belongs to a same pool of switching entities as the switching entity handling the attach request, said pool of switching entities being configured to control radio resources for a same radio network area, and
registering the terminal to the switching entity and registering the switching entity as a contact point for centralized services for the terminal at an application server for centralized services provision in case of the match being such that centralized services are applicable for the terminal and the switching entity handling the attach request has centralized-services capability.

9. The apparatus according to claim 8, wherein the processor is configured to cause the apparatus to perform
issuing an attach request response to the terminal, which comprises a non-broadcast location area identifier of the switching entity and a temporary mobile subscriber identity assigned for the terminal for designating the another switching entity as a handling target for a subsequent attach request of the terminal.

10. The apparatus according to claim 8, wherein
in case of the mismatch being such that centralized services are applicable for the terminal and the switching entity handling the attach request does not have centralized-services capability, the processor is configured to cause the apparatus to redirect the attach request to another switching entity having centralized-services capability, or
in case of the mismatch being such that centralized services are not applicable for the terminal and the switching entity handling the attach request has centralized-services capability, the processor is configured to cause the apparatus to redirect the attach request to another switching entity having no centralized-services capability.

11. The apparatus according to claim 8, wherein the processor is configured to cause the apparatus to perform
processing the requested attachment and registering the terminal by the switching entity handling the attach request in accordance with its centralized-services capability in case of a match between the determined centralized-services applicability for the terminal and the centralized-services capability of the switching entity.

12. The apparatus according to claim 8, wherein
the centralized-services applicability for the terminal comprises at least one of a centralized-services capability of the terminal and a centralized-services subscription of the user of the terminal, or
the processor is configured to cause the apparatus to perform downloading terminal- or user-related data from a home location register or a home subscriber server and evaluating the downloaded terminal- or user-related data in terms of indications for the applicability of centralized services for the terminal.

13. The apparatus according to claim 8, wherein
the attach request requests attachment of the terminal via circuit-switched access, or
the attach request comprises a location updating request.

14. The apparatus according to claim 8, wherein
the centralized services comprise IP multimedia subsystem centralized services, or
a switching entity comprises one of a mobile switching system, a mobile switching center and a mobile switching center server system of an IP multimedia subsystem centralized service system.

15. The apparatus according to claim 8, wherein
the apparatus is operable as or at the switching entity handling the attach request, or
the apparatus is operable in an IP multimedia subsystem centralized service system.

16. An apparatus comprising
a processor, and
a memory configured to store computer program code,
wherein the processor is configured to cause the apparatus to perform:
receiving an attach request for attachment of a terminal,
determining a centralized-services applicability for the terminal,
selecting a switching entity for handling the attach request out of a pool of switching entities such that the selected switching entity has a centralized-services capability matching the determined centralized-services applicability for the terminal, said pool of switching entities being configured to control radio resources for a same radio network area,
directing the requested attachment to the selected switching entity having the centralized-services capability matching the determined centralized-services applicability for the terminal, and
registering the terminal to the switching entity and registering the switching entity as a contact point for centralized services for the terminal at an application server for centralized services provision in case of the match being such that centralized services are applicable for the terminal and the switching entity handling the attach request has centralized-services capability.

17. The apparatus according to claim 16, wherein the processor is configured to cause the apparatus to perform
forwarding the attach request to the selected switching entity.

* * * * *